United States Patent Office 3,491,785
Patented Jan. 27, 1970

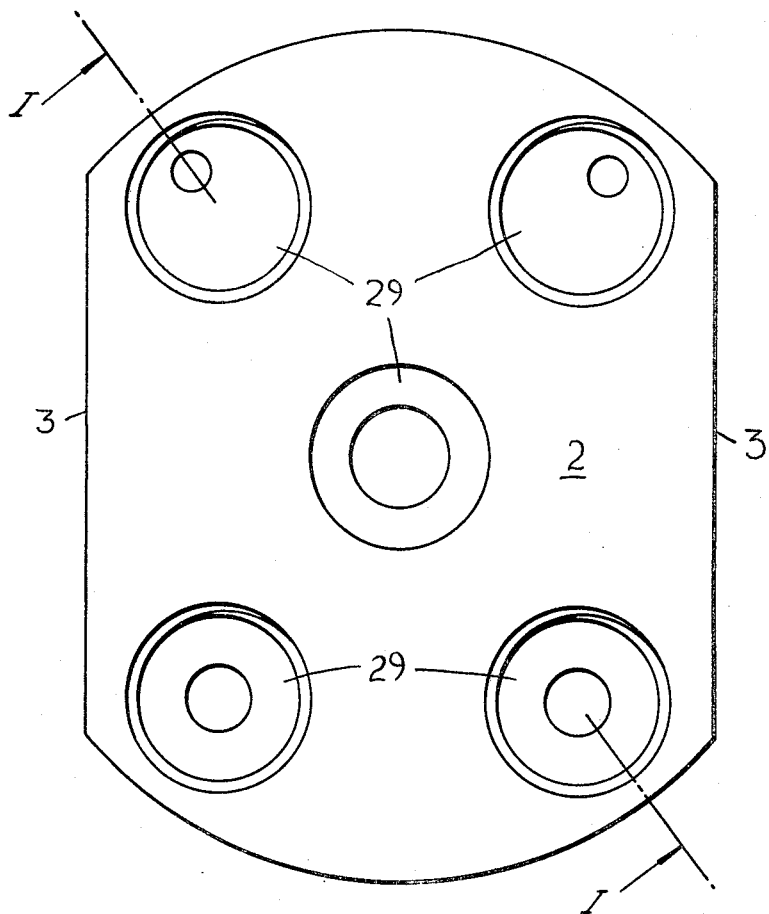

3,491,785
DUPLEX PRESSURE VALVES
Francis Xavier Kay, Winslow, England, assignor to Instruments and Movements Limited, London, England, a British company
Filed Dec. 27, 1967, Ser. No. 693,986
Claims priority, application Great Britain, Jan. 23, 1967, 3,376/67
Int. Cl. F15b 5/00; G05d 16/00; F16k 11/10
U.S. Cl. 137—85                                    9 Claims

ABSTRACT OF THE DISCLOSURE

A single duplex valve having a kinked characteristic provides an output pressure which is dependent upon the magnitude of an input force. The kinked characteristic is obtained by providing the valve with a two-part piston responsive to an input signal pressure which is to control the valve. The two parts of the piston are arranged to operate together over a part of the valve characteristic while over the remainder of the characteristic one of the parts is held fixed in position so that the valve is controlled thereafter only by the other piston part. The ratio of the areas of the two-part piston to the piston part capable of operating alone controls the power ratio of the valve and the change-over of the valve operation from the use of the two-part piston to the single piston part results in a kink in the valve characteristic.

Figure 1:
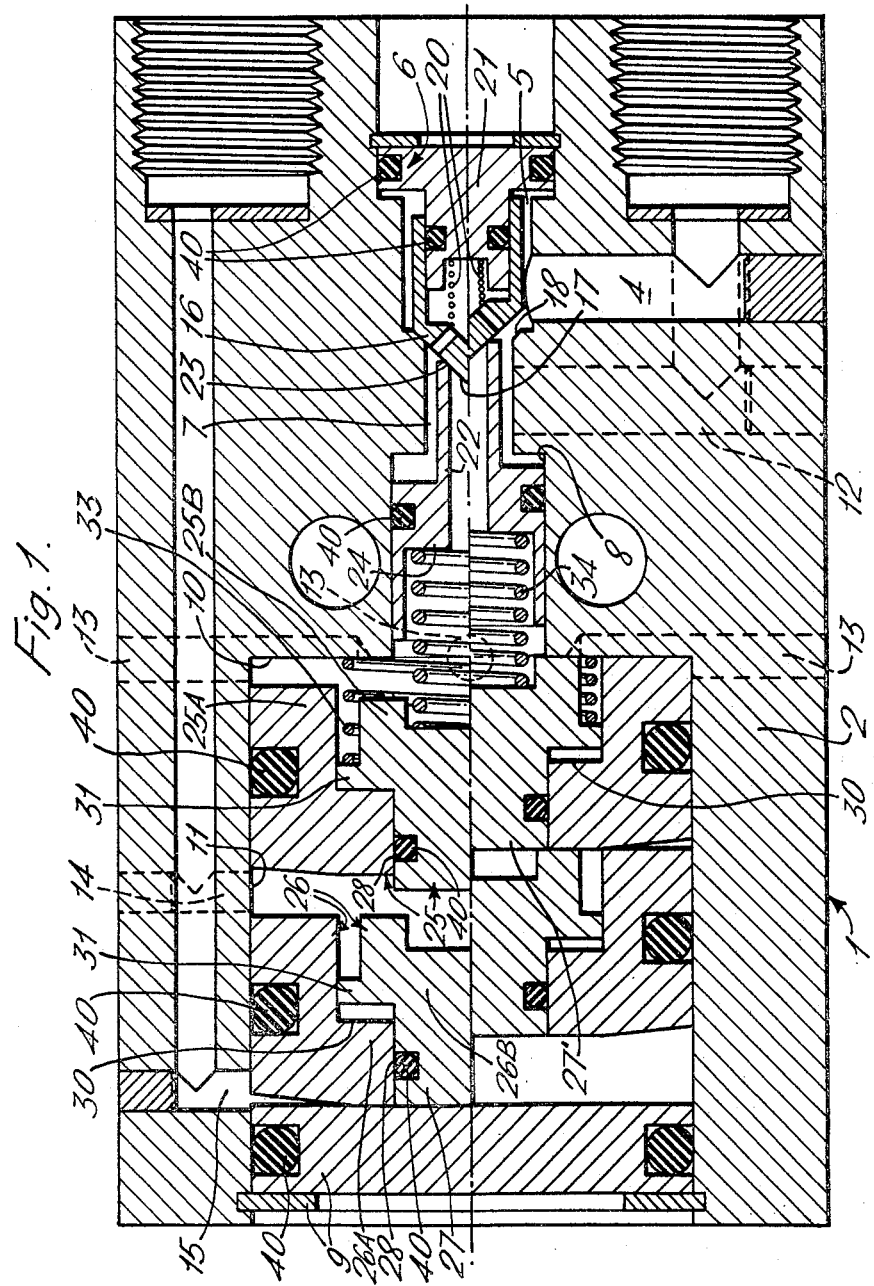

This invention relates to valves and is specifically concerned with remote actuated pressure reactive valves. Such valves may be used to control the pressure at which a working fluid is supplied to apparatus. The working fluid may be an hydraulic medium or a pneumatic medium.

Pressure reactive valves are designed to control the pressure of working fluid delivered in accordance with the magnitude of an applied input control signal. The input control signal may be generated manually and the pressure reactive valve responds to the control signal by delivering the working fluid at a pressure determined by the input signal.

Pressure reactive valves have numerous applications in servo-assisted and servo-controlled systems. For example heavy duty vehicles are customarily provided with pneumatic braking systems. These are manually controlled but the power required to brake a ten-ton vehicle to a halt in an acceptable distance is necessarily greater than can be exerted manually. The manual controls are therefore used to vary the magnitude of the input control signal to a pressure reactive valve which transmits a proportionally high pressure of working fluid to the braking systems of the vehicle.

Generally the pressure reactive valve comprises a closure member which is movable to interrupt or free a communicating passage in the valve body and extending between an inlet through which working fluid is applied to the valve and an outlet through which working fluid is delivered by the valve. When the valve is not delivering working fluid the closure member is held tightly against a seating at one end of the passage partly or entirely by a light coil spring and partly or entirely by the differential pressure across the closure member.

The closure member is moved towards and away from its seating by a piston rod which engages the outlet side of the closure member at one end and carries at its other end a piston movable inside a cylinder formed in the valve casing. The piston rod extends centrally through the passage and contains an axially extending bore which opens at one end through the piston while its other end is closed by abutment of the end face of the piston rod with the outlet side of the closure member. The abutting surfaces of the piston rod and closure member form a fluid-tight seal. The outlet through which working fluid is delivered by the valve opens radially or tangentially into the communicating passage.

When the valve is closed and the outlet pressure is above atmospheric, the piston head is at an intermediate position in its cylinder and is pressed towards one end of the passage by a coiled compression spring located between the piston head and a movable support. The support is manually movable towards and away from the head of the piston to vary the compression of the spring and thus the pressure of fluid delivered by the valve. When the valve is not delivering fluid and the outlet pressure is atmospheric the spring is completely relaxed.

The valve operates as follows. As long as the valve is not required to supply working fluid and the outlet is at atmospheric pressure, the manually-movable support is spaced from the piston head sufficiently for the spring to be relaxed and the closure member to be held by the differential pressure across it and the light spring in sealing engagement with the seat provided around one end of the passage communicating between the working fluid inlet and the working fluid outlet. Meanwhile the outlet is in free communication with atmosphere by way of the axial bore in the piston rod.

If the valve is required to deliver working fluid at a pressure between the inlet pressure and atmospheric pressure then the movable support is displaced towards the piston head. This compresses the spring until its thrust transmitted by the piston rod can overcome the thrust holding the closure member against its seat. The closure member is then moved away from its seat and working fluid can flow from the inlet to the outlet by way of the passage. As the outlet also communicates with the side of the piston head opposite the spring it will be appreciated that as the outlet pressure rises a progressively increasing force is exerted on the piston head in opposition to the thrust of the spring. When the force exceeds the thrust of the spring, the piston head moves against the spring and allows the closure member to seal once again the end of the communicating passage so that the flow of pressure fluid from the inlet to the outlet of the valve ceases.

As long as the outlet pressure remains at the value at which the force exerted by it on the piston head is not less than the thrust of the spring, then the valve will remain closed. However, if the spring pressure is increased manually by displacing the support further towards the piston head or by a reduction in the outlet pressure, the spring thrust will overcome the outlet pressure force on the piston head and move the piston rod in a direction which opens the valve. This allows further fluid to flow from the inlet to the outlet until the outlet pressure is restored to its former value at which the closure member once again closes.

If the support is moved away from the piston head when the outlet pressure is greater than atmospheric pressure, then the thrust of the spring on the piston head decreases and allows the outlet pressure force to move the piston head towards the spring. This causes the hollow piston rod to move out of sealing engagement with the closure member so that the outlet pressure fluid can exhaust through the bore of the piston rod to atmosphere by way of a vent in the portion of the cylinder containing the spring disposed between the piston head and support.

It will therefore be appreciated that a pressure reactive valve is able to provide an outlet fluid pressure which varies in accordance with the position of the support.

The support position may be adjusted manually and the pressure reactive valve provides a unique outlet pressure which varies linearly with the position to which the support is moved.

The growth in size of vehicles has led to the adoption of complex pneumatic systems for brake control and also for controlling other pneumatically operated mechanisms such as anti-jack-knife devices in conjunction with the braking systems. For example, it will be appreciated that the braking force necessary to stop a vehicle carrying a ten ton load is very much greater than that required for the vehicle when travelling unloaded. Likewise, the risk of jack-knifing is far greater with an articulated vehicle not carrying a load than it is with a heavily-loaded vehicle. The complex pneumatic circuitry heretofore used to meet these varying requirements stemming from different load conditions has utilised several valves which together provide a non-linear characteristic when the output pressure of the system is plotted against the magnitude of the control signal. In the case of anti-jack-knife devices the output pressure of the pneumatic system is arranged to increase rapidly with increase in magnitude of the control signal until a predetermined output pressure is obtained, after which further increase in magnitude of the control signal produces a smaller rate of increase in the output pressure of the working fluid.

An object of the present invention is the provision of an improved pressure reactive valve.

In accordance with the present invention a pressure reactive valve comprises a casing having an inlet for delivering working fluid to the casing, an outlet for delivering working fluid at an adjustable pressure from the casing, a passage inside the casing communicating between the inlet and the outlet, a valve seat formed around the passage and adapted to be engaged by a closure member disposed between the inlet and the passage, a piston rod containing a bore and disposed in the passage with one end of the bore adapted to be sealed by abutment with the closure member and the other end of the bore opening through a piston head mounted so as to be a close-sliding fit within a cylinder inside the casing, a duct extending through the casing from the portion of the cylinder remote from the piston rod, a thrust-transmitting spring disposed between the piston head and a support movable towards and away from the piston head, and means for applying a control signal to the support to displace it and thus vary the thrust of the spring; in which valve the support comprises a piston slidable in a chamber and having separately movable parts one of which is engaged by the spring, the parts interacting with one another and with stops in the chamber to limit movement of the piston parts to different extents, respectively, so that the effective area of the piston is diminished as the input signal magnitude increases, to provide the valve with a non-linear characteristic obtained when the input signal magnitude is plotted against the pressure of working fluid supplied by the valve. Preferably the piston comprises two concentrically arranged parts, although more than two could be used.

If desired more than one piston may be provided in the chamber to enable the valve to be operated by different input signals. This is of importance with anti-jack-knife devices as it is often required for them to be operated by a manual control as well as automatically as the braking is applied.

The invention will now be described in more detail, by way of example, with reference to the accompanying partly diagrammatic drawings, in which:

FIGURE 1 is a longitudinal section through a valve taken on the line indicated by the arrows I—I of FIGURE 2 and showing, in the top half, moving parts of the valve in their valve-closed positions, and, in the lower half, the moving parts in their valve-opened positions; and, FIGURE 2 shows the valve in end elevation as viewed from the right-hand end of FIGURE 1.

A remote actuated pressure reactive valve 1 comprises a short casing 2 slightly less than 3½ inches long of generally cylindrical shape but having two diametrically opposed flattened surfaces 3. For clarity of understanding various radial passages passing through the casing have been shown in dotted outline in the plane of the section of the drawing, but it is to be understood that they do not actually lie in that plane but other planes angularly displaced therefrom. Those radial passages which are to carry pressure fluid, such as compressed air, to and from the valve casing have their outer ends plugged and communicate through bores, extending parallel to the casing longitudinal axis, with internally threaded wells 29 shown in FIGURE 2 and which pipe connections at one end of the valve.

The casing is formed close to said one end with a radial inlet duct 4 which opens into the side of a cylindrical closure chamber 5 coaxially arranged with respect to the valve casing 2. The outer end of the chamber is plugged at 6 and its inner end communicates through a coaxially arranged passage 7 with a coaxially arranged cylinder 8 of larger cross-section than the passage. The cylinder 8 is formed centrally in the base 10 of a further coaxially arranged cylinder 11 of larger diameter and hereinafter referred to as the signal cylinder to distinguish it from the smaller diameter cylinder 8 leading into the passage and hereinafter referred to as the control cylinder. The end of the signal cylinder 11 remote from the control cylinder 8 is plugged by an insert piece 9.

The valve casing 2 is formed with a radially extending outlet duct 12 leading at its inner end into the communicating passage 7. Four equi-spaced air ducts 13 lead to atmosphere from the base of the signal cylinder. A radially extending channel 14 leads through the valve casing into the central portion of the signal cylinder 11 for applying a pneumatic control signal to it. A second channel 15 opens radially into the signal cylinder 11 at its end remote from the control cylinder 8 and is for connection to an alternative source of input signals entirely separate from that connected to the second channel.

Mounted in the closuure chamber 5 is a cup-shaped closure member 16 having a conical base 17 which is axially movable with respect to the chamber 5 and communicating passage 7. The outer marginal portion of the closure member 16 is held by a bias spring 20 lightly against a seating surface 18 formed around the rim of the adjacent end of the communicating passage 7. The bias spring 20 is disposed between the inside surface of the base 17 of the cup-shaped closure member 16 and a spigot 21 extending into the chamber from the plug which closes it from atmosphere.

Mounted inside the communicating passage 7 is a tubular piston rod 22. The bore of the piston rod is closed at one end by the abutment of the end 23 of the piston rod 22 against the base 17 of the closure member 16. The piston rod 22 is held centrally in the communicating passage 7 by a hollow piston head 24 which is a close sliding fit inside the control cylinder 8. The bore of the piston rod 22 opens through the head 24 of the piston so that it is at all times in communication with atmosphere by way of the ducts 13 formed in the base 10 of the signal cylinder 11.

Two spaced two-part pistons 25, 26 are mounted inside the signal cylinder 11. The pistons 25, 26 are each slidable axially of the cylinder 11 and one of them referenced 26 is disposed between the two channels 14, 15 opening through the side of the cylinder 11 while the other 25 is disposed between the base 10 of the cylinder 11 and the channel 14.

Each two-part piston 25, 26 comprises an outer annular piston 25A, 26A containing an inner bobbin-shaped piston 25B, 26B. The core 27 and 27' of each bobbin-shaped piston is a close sliding fit in the annulus 28 of the outer piston part 25A, 26A which is stepped at 30 around its annulus to provide a seating to receive a radial flange 31 formed at one end of the bobbin-shaped piston 25B, 26B. The periphery of the bobbin-shaped piston 25B is shouldered on its side adjacent the base 10 to accommodate one end of a light coil compression spring 33. The other end of the coil spring 33 abuts the base 10. A second coil spring 34 extends axially into the control cylinder 8, and has one end held in a recessed portion of the bobbin-shaped part 25B, and its other end held inside the hollow piston head 24.

Various seals 40 of self-lubricating material and composed of O-rings are used to confine the working fluid to the desired part of the valve.

The above described valve is operated as follows.

As long as the two channels 14, 15 leading into the signal cylinder 11 contain air at atmospheric pressure, the spring 34 in the control cylinder 8 is relaxed and the closure member 16 is lightly pressed by its bias spring 20 against the seating 18 around the mouth of the communicating passage 7. The communicating passage is at atmospheric pressure as the end of the piston rod 22 is spaced from the base 17 of the closure member at this time. The outlet 12 is therefore at atmospheric pressure and the differential pressure across the right hand rim (as shown) of the closure member 16 helps retain it across the mouth of the communicating passage.

If a control signal provided by compressed air is admitted through the channel 14 into the space between the two two-part pistons 25, 26, the piston 25 adjacent the base 10 of the signal cylinder 11 moves towards the control cylinder 8 and partially compresses the coil spring 34 against the piston head 24. The thrust exerted by the coil spring 34 on the piston head 24 is transmitted by way of the piston rod 22 to the bottom 17 of the cup-shaped closure member 16 and eases it away from its seat 8 to the positions shown in the lower half of FIGURE 1. This allows compressed air, forming the working fluid, to flow from the inlet 4 through the communicating passage 7 to the outlet 12. This compressed air is unable to exhaust to atmosphere as the engagement of the sealing rim 23 of the piston rod 22 with the base 17 of the closure member 16 closes the right-hand end (as shown) of the bore in the piston rod 22.

As working fluid is provided to the outlet 12, the outlet pressure rises. This rise in pressure is reflected back through the communicating passage 7 to the control cylinder 8 and it acts on one side of the piston head 24. The other side of the piston head 24 is at atmospheric pressure and therefore the increasing force exerted on the piston head 24 by the progressively increasing pressure in the communicating passage 7 eventually urges the piston head 24 against the thrust of the spring 34. This movement of the piston head 24 is accompanied by movement of the closure member 16 in the closing direction towards its seat 18. This movement occurs very rapidly following opening of the closure member 16 and results in prompt closure of the valve 1 as soon as the thrust of the spring 34 has been counterbalanced by the force exerted on the piston 24 by the rising pressure in outlet 12.

As long as the outer annular portion 25A of the two-part piston 25 is not in contact with the base 10 the thrust of the spring 34 will equal the product of the input signal pressure and the area of the two-part piston 25. This area is six times the cross-sectional area of the core 27' of the bobbin part 25B of the two-part piston 25, so that a power gain ratio of 6:1 is obtained. However, once the outer annular piston 25A engages the base 10 its further movement towards the control cylinder 8 is prevented and further increase in the input signal pressure exerted between the pistons 25, 26 produces an increase in thrust equal only to the input signal pressure times the cross-sectional area of the core 27' of the bobbin piston 25B. This area, being six times less than the total area of the two-part piston 25, results in a kink appearing in the characteristic of the valve 1 obtained by plotting inlet signal pressure against working fluid outlet pressure. The same increase in input signal pressure will then produce only ⅙ increase in thrust after the outer annular part 25A of the piston has engaged the base 10, as compared with the increase in thrust obtained before such engagement. The further movement of the bobbin piston part 25B is possible as its right-hand end, as viewed in FIGURE 1, is spaced from the base 10 when the left-hand side of the flange 31 is against the step 30. It will be understood that by suitably selecting the relative areas of the two parts 25A, 25B of the piston, virtually any power gain ratio for the two parts of the piston may be obtained, instead of the 6:1 ratio mentioned above.

If the input signal pressure is plotted against the outlet fluid pressure it will be found that the resultant curve comprises two straight lines of different inclinations which meet one another at a kink. The kink coincides with the engagement of the outer annular portion 25A of the two-part piston 25 with the base 10.

If now the input signal pressure applied through channel 14 is reduced, the force produced by the outlet fluid pressure on the piston head 24 in the control cylinder 8 moves the piston 22 against the force of the spring 34 so that the sealing rim 23 of the piston rod 22 separates from the base of the closure member 16 to allow some of the outlet pressure fluid in the passage 7 to escape through the bore of the piston rod 22 to the control cylinder 8 and thus to atmosphere by way of the ducts 13. Thus an immediate reduction in fluid pressure in the outlet 12 occurs and this causes the piston head 22 in the control cylinder 8 to be returned by the spring 34 to its equilibrium position at which the sealing rim 23 of the piston rod 22 again seals gainst the closure member 16. The valve therefore follows fluctuations in input signals by corresponding fluctuations in pressure of the working fluid delivered by the valve 1, but the ratio of the input fluid pressure to the output fluid pressure varies in accordance with the absolute pressure of the input signal.

The purpose of the second two-part piston 26 is to enable the valve to be operated by a separate source of pressure. This source of pressure, suitably pneumatic, is admitted to the signal cylinder 11 via the duct 15 behind the second two-part piston 26 to drive it against the first two-part piston 25. The thrust of the second two-part piston 26 is proportional to its total area and is transmitted through the bobbin part 25B of the first two-part piston 25 which is engaged by the corresponding part 26B of the second two-part piston 26 as clearly shown in the drawing. A stop (not shown) is provided inside the signal cylinder 11 to limit the movement of the outer annular part 26A of the second two-part piston 26 so that the inner bobbin part 26B is effective after the pressure applied through channel 15 to the second two-part piston 26 exceeds a predetermined level.

The function of the light coil compression spring 33 is to hold the bobbin part 25B away from the base 10 when the spring 34 is relaxed, so that the interior of the hollow piston head 24 is held at atmospheric pressure through always being in communication with the four open-ended ducts 13.

I claim:

1. A pressure reactive valve comprising: a casing having an inlet for delivering working fluid to the casing and an outlet for delivering working fluid at an adjustable pressure from the casing; a passage inside the casing communicating between the inlet and the outlet; a valve seat formed around the passage and adapted to be engaged by a closure member disposed between the inlet and the passage; a piston rod containing a bore and disposed in the passage with one end of the bore adapted to be sealed by abutment with the closure member and the other end of the bore opening through a piston head mounted so as to be a close sliding fit within a cylinder inside the casing; a duct extending through the casing from a portion of the cylinder remote from the piston rod; a thrust-transmitting spring disposed between the piston head and a piston movable towards and away from the piston head; a working chamber enclosing the piston; parts to said piston constituting same and separately movable axially of the chamber while remaining in sealing engagement with one another, one of said parts being engaged by the thrust-transmitting spring; stop means in the chamber limiting movement of the piston parts to different extents, respectively; and means for applying a fluid pressure control signal to the side of the piston remote from said piston head.

2. A pressure reactive valve comprising: a casing having an inlet for delivering working fluid to the casing; an outlet for delivering working fluid at an adjustable pressure from the casing; a passage inside the casing communicating between the inlet and the outlet; a valve seat formed around the passage and adapted to be engaged by a closure member disposed between the inlet and the passage; a piston rod containing a bore and disposed in the passage with one end of the bore adapted to be sealed by abutment with the closure member and the other end of the bore opening through a piston head mounted so as to be a close sliding fit within a cylinder inside the casing; a duct extending through the casing from a portion of the cylinder remote from the piston rod; a thrust-transmitting spring disposed between the piston head and a first piston movable towards and away from the piston head; means for applying a control signal to said first piston to displace it axially of a piston chamber towards and away from said piston head to vary the thrust of said thrust-transmitting spring; separately movable parts constituting said first piston and one of which is engaged by the thrust-transmitting spring; sealing means permitting relative sliding movement axially of said chamber between said piston parts; stop means in the chamber limiting movement of said piston parts to different extents, respectively, towards said piston head; a second piston mounted in said chamber on the side of said first piston opposite said piston head; and pressure fluid inlet means opening into said chamber on both sides of said second piston, respectively.

3. A valve as set forth in claim 2, in which said second piston is constituted by two piston parts movable axially of the chamber with respect to one another, and sealing means for maintaining said second piston parts in sealing engagement with one another and with the chamber wall.

4. A valve as claimed in claim 2, in which each of said first and second pistons comprises an inner piston part axially movable in the annulus of an outer piston part engaging the chamber wall with its periphery in sealing tight manner, an abutment surface provided on said outer piston part and engaged by said inner piston part during movement of said outer piston part towards said piston head, such movement of the outer piston part being limited by engagement with said stop means which allow further limited movement of said inner piston part towards the piston head.

5. A valve as claimed in claim 4, in which said stop means comprises one end wall of said chamber, said inner piston part is provided with a peripheral flange adapted to abut an abutment surface of said outer piston part during movement thereof towards said piston head, the axial length of said outer piston part as measured from said abutment surface towards said piston head being greater than the axial length measured in the same direction of said inner piston part when its flange face is engaged with said abutment surface.

6. A valve as claimed in claim 5, including a weak compression spring disposed between said inner part of the first piston and said stop means provided by the end wall of the chamber.

7. A valve as claimed in claim 2, in which one end-portion of said thrust-transmitting spring is disposed in a well formed in said piston head, the other end-portion of said spring is disposed in a rebate in a central portion of said first piston, and ducts exhausting to atmosphere from the end of said chamber containing said stop means, and bores extending parallel to the axis of said valve casing from one end thereof and internally threaded for receiving pipe couplings through which pressure working fluid is admitted to, and withdrawn from said valve.

8. A pressure reactive valve comprising: a casing having an inlet for delivering working fluid to the casing and an outlet for delivering working fluid at an adjustable pressure from the casing; a passage inside the casing communicating between the inlet and the outlet; a valve seat formed around said passage and adapted to be engaged by a closure member disposed between the inlet and the passage; a piston rod containing a bore and disposed in the passage with one end of the bore adapted to be sealed by abutment with the closure member and the other end of the bore opening through a piston head mounted so as to be a close sliding fit within a cylinder inside the casing; a duct extending through the casing from a portion of the cylinder remote from the piston rod; a thrust-transmitting spring disposed between the piston head and a piston movable towards and away from the piston head; a working chamber enclosing the piston; parts to said piston constituting same and separately movable axially of the chamber while remaining in sealing engagement with one another, one of said parts being engaged by the thrust-transmitting spring; stop means in the chamber limiting movement of the piston parts to different extents respectively; means for applying a fluid pressure control signal to the side of the piston remote from said piston head; a second piston in said chamber disposed on the opposite side of the first piston to said thrust-transmitting spring; and pressure inlet channels opening into said chamber at both sides of the second piston respectively.

9. A valve as set forth in claim 8, in which said piston comprises two concentrically arranged parts of different areas, respectively.

References Cited

UNITED STATES PATENTS

| 2,797,665 | 7/1957 | Chouings | 91—434 |
| 3,054,386 | 9/1962 | Bohnhoff | 91—434 XR |
| 3,252,471 | 5/1966 | Olson | 92—6 XR |
| 3,353,637 | 1/1967 | Chana | 92—62 XR |

ROBERT G. NILSON, Primary Examiner

U.S. Cl. X.R.

91—433; 92—62